United States Patent
Kasahara et al.

(10) Patent No.: US 11,914,205 B2
(45) Date of Patent: Feb. 27, 2024

(54) COATED OPTICAL FIBER, OPTICAL FIBER CABLE, AND COATED OPTICAL FIBER RIBBON

(71) Applicant: FURUKAWA ELECTRIC CO., LTD., Tokyo (JP)

(72) Inventors: Minoru Kasahara, Tokyo (JP); Yoshihiro Arashitani, Tokyo (JP); Kouji Mochiduki, Tokyo (JP); Masahiro Yabe, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/821,537

(22) Filed: Aug. 23, 2022

(65) Prior Publication Data
US 2022/0397732 A1 Dec. 15, 2022

Related U.S. Application Data

(63) Continuation of application No. PCT/JP2021/010778, filed on Mar. 17, 2021.

(30) Foreign Application Priority Data

Mar. 18, 2020 (JP) .................. 2020-047923

(51) Int. Cl.
*G02B 6/44* (2006.01)
*G02B 6/02* (2006.01)

(52) U.S. Cl.
CPC ....... *G02B 6/4403* (2013.01); *G02B 6/02009* (2013.01); *G02B 6/02395* (2013.01)

(58) Field of Classification Search
CPC .............. G02B 6/4403; G02B 6/02009; G02B 6/02395

(Continued)

(56) References Cited

U.S. PATENT DOCUMENTS 6,804,442 B1 10/2004 Watanabe et al.
11,435,518 B2 * 9/2022 Kasahara ........... G02B 6/02019
(Continued)

FOREIGN PATENT DOCUMENTS

JP          3-155510 A     7/1991
JP          H0611634 A     1/1994
(Continued)

OTHER PUBLICATIONS

WIPO, Japanese International Search Authority, International Search Report (with English translation) and Written Opinion dated Jun. 8, 2021 in International Patent Application No. PCT/JP2021/010778, 13 pages.

(Continued)

*Primary Examiner* — Jerry M Blevins
(74) *Attorney, Agent, or Firm* — MASUVALLEY & PARTNERS; Peter Martinez

(57) ABSTRACT

The present invention satisfies at least one of the condition of the degree of freedom of a primary layer 11 shown in the equation (I) and the condition of the rigidity of a secondary layer 12 shown in the equation (II). Thus, a coated optical fiber 1 capable of suppressing transmission loss in a low temperature environment is provided, in which, even when an optical fiber 10 having a large effective core cross-sectional area $A_{eff}$ of the optical fiber 10 at a wavelength of 1550 nm and having high microbend sensitivity is used, transmission loss in a low temperature environment can be suppressed.

[Math. 1]

$$\beta_P \times P_{ISM} < 600 \tag{I}$$

$$(S/P) \times (S_{ISM}/P_{ISM}) \leq 1000 \tag{II}$$

7 Claims, 1 Drawing Sheet

(58) Field of Classification Search
USPC .......................................................... 385/114
See application file for complete search history.

(56) References Cited

U.S. PATENT DOCUMENTS

| | | |
|---|---|---|
| 2003/0215196 A1 | 11/2003 | Bulters et al. |
| 2004/0022510 A1* | 2/2004 | Suzuki ................ G02B 6/4403 385/128 |
| 2009/0269015 A1 | 10/2009 | Nakajima et al. |
| 2013/0330050 A1 | 12/2013 | Yang et al. |
| 2014/0294355 A1 | 10/2014 | Bickham et al. |
| 2017/0031092 A1* | 2/2017 | Sohma ................ G02B 6/4402 |
| 2019/0146150 A1 | 5/2019 | Konstadinidis et al. |
| 2019/0384000 A1 | 12/2019 | Tamura et al. |
| 2021/0199883 A1 | 7/2021 | Kasahara et al. |

FOREIGN PATENT DOCUMENTS

| | | |
|---|---|---|
| JP | 2004-059420 A | 2/2004 |
| JP | 2015-219271 A | 12/2015 |
| JP | 2016-519333 A | 6/2016 |
| JP | 2019-112293 A | 7/2019 |
| WO | WO2002/066390 A1 | 8/2002 |
| WO | WO2008/012926 A1 | 1/2008 |
| WO | WO2018/159146 A1 | 9/2018 |
| WO | WO2020/054753 A1 | 3/2020 |

OTHER PUBLICATIONS

Nakajima, Y. et al., "Measuring method of thermal strain and thermal stress generated in the optical fiber coating layer, A Study for Estimating Thermal Strain and Residual Stress in Optical Fiber Coatings," *Furukawa Electric Time Signal* No. 122, Sep. 2008, pp. 8-12 (with English translation, 13 pages).
WIPO, Japanese International Search Authority, Written Opinion dated Jun. 8, 2021 in International Patent Application No. PCT/JP2021/010778 with English translation, total 11 pages.

* cited by examiner

COATED OPTICAL FIBER, OPTICAL FIBER CABLE, AND COATED OPTICAL FIBER RIBBON

RELATED APPLICATIONS

This application is a continuation of and claims priority to International Patent Application No. PCT/JP2021/010778, International Filing Date Mar. 17, 2021, entitled Optical Fiber Core Wire And Optical Fiber Cable, which claims priority to Japanese Application No. 2020-047923 filed Mar. 18, 2020, both of which are hereby incorporated herein by reference in their entireties.

TECHNICAL FIELD

The present invention relates to a coated optical fiber, an optical fiber cable, and a coated optical fiber ribbon. More specifically, the present invention relates to a coated optical fiber, an optical fiber cable, and coated optical fiber ribbon capable of suppressing transmission loss (microbend loss) due to microbend.

BACKGROUND ART

In recent years, with the spread of the Internet, FTTH (Fiber To The Home), which realizes high-speed communication services by directly drawing optical fibers into ordinary households, is rapidly expanding.

In optical fibers, transmission loss (optical transmission loss) increases due to various external stresses and microbend generated thereby, and in order to reduce the transmission loss of the optical fibers, improvement in the microbend resistance of the optical fibers has been demanded. In order to protect the optical fibers from external stress, on an optical fiber such as a glass optical fiber, at least two coating layers such as a primary layer (also called a primary coating layer) and a secondary layer (also called a secondary coating layer) are formed, and this is used as a coated optical fiber.

In order to suppress the transmission loss caused by microbend (equated with "microbend loss" in the present invention, the same applies hereinafter) by forming such coating layers, it has been common to reduce the elastic modulus of the primary layer and increase the elastic modulus of the secondary layer. In addition, in order to reduce the coating thicknesses of the coating layers in the optical fiber in order to attain high density and high fiber count in an optical cable, and compensate for the lateral pressure characteristics and the like, a technology that further increases the elastic modulus (Young's modulus) of the secondary layer is provided (see, for example, Patent Literature 1 and the like).

In addition, an optical fiber is desired to have good transmission characteristics even in a low temperature environment of about −60° C. so that it can be applied to the seabed or cold land. In order to maintain good transmission characteristics in a low temperature environment, it is common to lower the glass transition point of the primary layer. Further, for example, a technique that requires adjustment such as making the sum of shrinkage stress indices defined based on the Young's modulus, the cross-sectional area, the effective linear expansion coefficient, etc. of the coating layer at −40° C. below a certain value is provided (see, for example, Patent Literature 2, etc.).

CITATION LIST

Patent Literatures

Patent Literature 1: JP 6-11634 A ([Claim 2] to [Claim 4], etc.)
Patent Literature 2: WO 2002/066390 A

SUMMARY OF INVENTION

Technical Problem

However, for example, in an optical fiber having a large effective core cross-sectional area $A_{eff}$ of an optical fiber and having high microbend sensitivity, it has been difficult to suppress the transmission loss in a low temperature environment such as −60° C. only by adjusting the elastic modulus as described in Patent Literature 1 described above or adjusting parameters such as the shrinkage stress index as described in Patent Literature 2.

The present invention has been made in view of the above problem, and provides a coated optical fiber, an optical fiber cable, and a coated optical fiber ribbon capable of suppressing transmission loss (microbend loss) in a low temperature environment such as −60° C. even in an optical fiber having high microbend sensitivity.

Solution to Problem

In order to solve the above problem, according to the present invention, there is provided a coated optical fiber in which a primary layer that covers an optical fiber is formed around the optical fiber, and a secondary layer that covers the primary layer is formed around the primary layer, the primary layer and the secondary layer being formed in this order, in which an effective core cross-sectional area $A_{eff}$ of the optical fiber at a wavelength of 1550 nm is 130 μm2 or more, and in which, when a coating thickness of the primary layer is P (μm), a coating thickness of the secondary layer is S (μm), a thermal expansion coefficient of the primary layer is βP (/K), an elastic modulus (primary elastic modulus) of the primary layer is PISM (MPa), and an elastic modulus (secondary elastic modulus) of the secondary layer is SISM (MPa), at least one of conditions of the following equations (I) and (II) is satisfied.

[Math. 1]

$$\beta_P \times P_{ISM} < 600 \times 10^{-6} \tag{I}$$

$$(S/P) \times (S_{ISM}/P_{ISM}) \leq 1000 \tag{II}$$

In the coated optical fiber according to the present invention, in the above-mentioned present invention, a ratio (S/P) of the coating thickness S of the secondary layer to the coating thickness P of the primary layer is less than 1.

In the coated optical fiber according to the present invention, in the above-mentioned present invention, the elastic modulus (secondary elastic modulus) $S_{ISM}$ of the secondary layer is 2,000 MPa or less.

According to the present invention, there is provided an optical fiber cable including the coated optical fiber according to the above-mentioned present invention.

According to the present invention, there is provided a coated optical fiber ribbon including a plurality of the coated optical fibers according to the above-mentioned present invention.

Advantageous Effects of Invention

The present invention satisfies at least one of the condition of the degree of freedom of the primary layer shown in the equation (I) and the condition of the rigidity of the secondary layer shown in the equation (II). Thus, a coated optical fiber capable of suppressing transmission loss in a low temperature environment is provided, in which, even when an optical fiber having a large effective core cross-sectional area $A_{\it{eff}}$ of the optical fiber at a wavelength of 1550 nm and high microbend sensitivity is used, transmission loss (microbend loss) in a low temperature environment (for example, −60° C., etc.) can be suppressed.

Further, the optical fiber cable or the coated optical fiber ribbon including the coated optical fiber according to the present invention enjoys the effects of the coated optical fiber described above, and is an optical fiber cable or a coated optical fiber ribbon including the coated optical fiber capable of suppressing transmission loss in a low temperature environment (for example, −60° C., etc.).

DESCRIPTION OF EMBODIMENTS

Hereinafter, one aspect of the present invention will be described. In a coated optical fiber 1 according to the present invention, at least two coating layers (primary layer 11 and secondary layer 12) that cover an optical fiber 10 are formed around the optical fiber 10.

Figure 1:
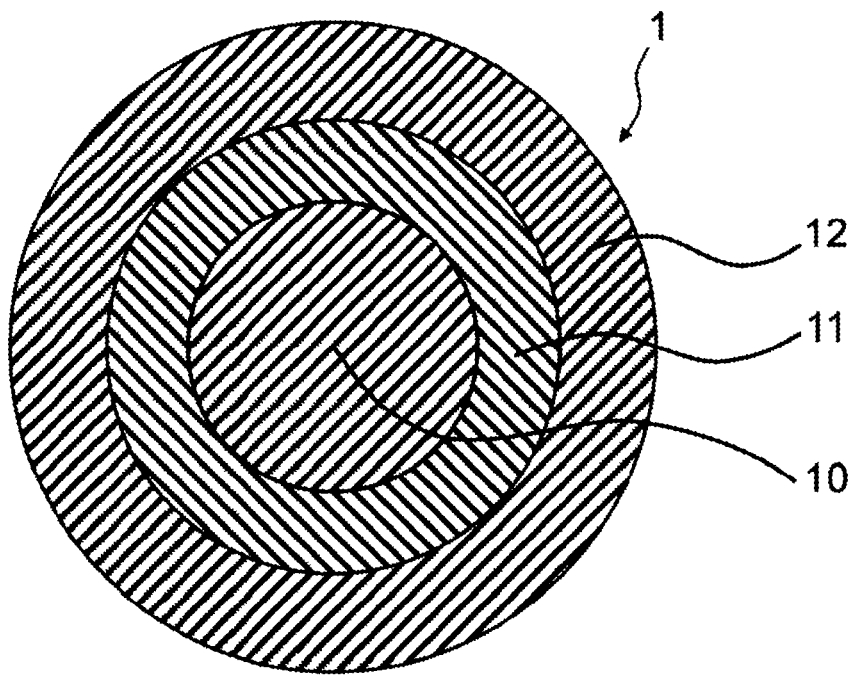
FIG. 1 is a cross-sectional view showing an example of the structure of a coated optical fiber.

(1) Structure of Coated Optical Fiber 1:

FIG. 1 is a cross-sectional view showing an example of the structure of the coated optical fiber 1. In FIG. 1, reference symbol 1 is a coated optical fiber, reference symbol 10 is an optical fiber, reference symbol 11 is a primary layer (primary coating layer), and reference symbol 12 is a secondary layer (secondary coating layer).

In the configuration of FIG. 1, the primary layer (primary coating layer) 11 is formed around the optical fiber 10, and the secondary layer (secondary coating layer) 12 is formed around the primary layer 11. Since the transmission loss of the optical fiber 10 increases due to various external stresses and microbend generated by the external stresses, it is necessary to protect the optical fiber 10 from such external stresses, and generally, as a protective layer, a coating having a two-layer structure including the primary layer 11 and the secondary layer 12 is applied.

The optical fiber 10 such as a glass optical fiber is not particularly limited, but in the present invention, an optical fiber 10 having a large effective core cross-sectional area $A_{\it{eff}}$ (described later in detail) of the optical fiber 10 at a wavelength of 1550 nm and having high microbend sensitivity can be preferably used.

In the present invention, as the optical fiber 10, an optical fiber 10 having an effective core cross-sectional area (effective core cross-sectional area) Aeff of 130 μm2 or more (≥130 μm2) at a wavelength of 1550 nm is used. In the optical fiber 10, Aeff is an index of the microbend sensitivity, and the larger Aeff is, the higher the microbend sensitivity (generally, it is said that the microbend sensitivity is high when Aeff>100 μm2). Therefore, if Aeff is 130 μm2 or more, the optical fiber 10 has high microbend sensitivity without any problem, and the present invention can cope with such a case. It is particularly preferable that the effective core cross-sectional area (effective core cross-sectional area) Aeff at a wavelength of 1550 nm is larger than 130 μm2 (>130 μm2).

The effective core cross-sectional area (effective core cross-sectional area) $A_{\it{eff}}$ at a wavelength of 1550 nm is expressed by the equation of $((MFD)^2 \times \pi \times k/4$ (MFD is a mode field diameter (μm), and k is a constant), and, for example, it is described in C-3-76 and C-3-77 of Proceedings of the Electronics Society Conference of IEICE in 1999.

For example, when the optical fiber 10 is a glass optical fiber, the primary layer 11 formed around the optical fiber 10 is an inner layer that comes into contact with silica glass constituting the glass optical fiber, and generally, soft resin having a relatively low elastic modulus is used. Generally, a secondary layer 12 using hard resin having a relatively large elastic modulus is applied on an outer layer of the primary layer 11.

As the constituent materials of the primary layer 11 and the secondary layer 12, ultraviolet curable resin, for example, oligomer, diluting monomer, photoinitiator, silane coupling agent, sensitizer, lubricant, and the components of the various additives described above can be preferably used (the additives are not limited to these, and conventionally known additives and the like used for the ultraviolet curable resin and the like can be widely used). For example, as the oligomer, conventionally known materials such as polyether-based urethane acrylate, epoxy acrylate, polyester acrylate, silicone acrylate, or the like can be used. Further, as the diluting monomer, monofunctional monomer, polyfunctional monomer, or the like can be used.

In the coated optical fiber 1 according to the present invention, regarding the primary layer 11 and the secondary layer 12, when the coating thickness of the primary layer 11 is P (μm), the coating thickness of the secondary layer 12 is S (μm), the thermal expansion coefficient of the primary layer 11 is βP (/K), the elastic modulus (primary elastic modulus) of the primary layer 11 is PISM (MPa), and the elastic modulus (secondary elastic modulus) of the secondary layer 12 is SISM (MPa), at least one of the conditions of the following equations (I) and (II) is satisfied.

[Math. 2]

$$\beta_P \times P_{ISM} < 600 \times 10^{-6} \quad (I)$$

$$(S/P) \times (S_{ISM}/P_{ISM}) \leq 1000 \quad (II)$$

First, the equation (I) is the product of the thermal expansion coefficient $\beta_P$ of the primary layer 11 and the elastic modulus $P_{ISM}$ of the primary layer 11, and is a condition indicating the degree of freedom (movability) of the primary layer 11 (the unit is MPa/K, but it is not specifically defined in the equation (I).).

Generally, under normal conditions such as room temperature, it is considered that, if the degree of freedom determined by the equation (I) is large and the primary layer 11 is easy to move inside the coated optical fiber 1 (between the optical fiber 10 and the secondary layer 12), even when slight bending occurs in the coated optical fiber 1, the slight bending can be alleviated by the primary layer 11. As a result, it becomes difficult to transmit slight bending behavior to the optical fiber 10, and it is considered that transmission loss (microbend loss) can be suppressed.

Further, the equation (II) is the product of the coating thickness ratio (S/P) and the elastic modulus ratio ($S_{ISM}/P_{ISM}$) with respect to the primary layer, and represents the condition of the rigidity of the secondary layer 12.

The secondary layer 12 is basically the outermost layer of the coated optical fiber 1, and the rigidity of the secondary layer 12 determined by the equation (II) affects the rigidity of the entire coated optical fiber 1 so to speak. When the rigidity of the secondary layer 12 is relatively high, it becomes difficult to bend the secondary layer 12 or the coated optical fiber 1 when the coated optical fiber 1 is slightly bent. Therefore, if the rigidity of the secondary layer 12 is excessive, it becomes difficult to release stress from the secondary layer 12 for slight bending of the optical fiber 10. From the above, the rigidity of the secondary layer 12 represented by the equation (II) needs to be suppressed to a certain level even in a low temperature environment.

Here, satisfying at least one of the above-mentioned conditions of the equations (I) and (II) is, in other words, excluding the case where both the conditions of the following equations (I') (II') are satisfied.

[Math. 3]

$$\beta_P \times P_{ISM} \geq 600 \times 10^{-6} \quad \text{(I')}$$

$$(S/P) \times (S_{ISM}/P_{ISM}) > 1000 \quad \text{(II')}$$

Hereinafter, in the present invention, the reason for excluding the case where both the conditions of the equations (I') and (II') are satisfied will be described. In a low temperature environment such as −60° C., the primary layer 11 which is relatively soft at room temperature also becomes hard (note that the secondary layer 12 is hard even at room temperature), so that the relaxation effect of the primary layer 11 described above does not work so much.

Here, when the rigidity of the secondary layer 12 is as low as 1000 or less (the condition shown in the equation (II) is satisfied), it is considered that the stress is released to the secondary layer 12 without being affected by the degree of freedom of the primary layer 11. On the other hand, when the rigidity of the secondary layer 12 is higher than 1000 (the condition shown in the equation (II') is satisfied), if the degree of freedom of the primary layer 11 is $600 \times 10^{-6}$ or more (the condition shown in the equation (I') is satisfied), the stress generated by the slight bending cannot be released to the rigid secondary layer 12. In this case, the generated stress is transmitted to the optical fiber 10 side, and as a result, the transmission loss (microbend loss) is increased.

Even when the rigidity of the secondary layer 12 is higher than 1000, if the degree of freedom of the primary layer 11 is less than $600 \times 10^{-6}$ (the condition shown in the equation (I) is satisfied), the degree of freedom of the primary layer 11 is low, and the primary layer 11 becomes hard at low temperature and becomes more difficult to bend, so that it is considered that stress is not easily transmitted to the optical fiber 10 side and transmission loss (microbend loss) can be suppressed. so that it is considered that stress is not easily transmitted to the optical fiber 10 side and transmission loss (microbend loss) can be suppressed.

When the rigidity of the secondary layer 12 represented by the equation (II) is higher than 1000 (that is, the condition of the equation (II) is not satisfied (the condition of the equation (II') is satisfied), the degree of freedom of the primary layer 11 represented by the equation (I) is preferably $50 \times 10^{-6}$ MPa/K or more and less than $600 \times 10^{-6}$ MPa/K. Further, when the rigidity of the secondary layer 12 is 1000 or less (that is, the condition of the equation (II) is satisfied), it is preferably $50 \times 10^{-6}$ to $7,500 \times 10^{-6}$ MPa/K.

When the degree of freedom of the primary layer 11 represented by the equation (I) is less than $600 \times 10^{-6}$ MPa/K (that is, the condition of the equation (I) is satisfied), the rigidity of the secondary layer 12 represented by the equation (II) is preferably 25 to 9,000. Further, if the degree of freedom of the primary layer 11 is $600 \times 10^{-6}$ MPa/K or more (that is, the condition of the equation (I) is not satisfied (the condition of the equation (I') is satisfied)), it is preferably less than 1,000 (<1,000), and is particularly preferably 25 to 1,000.

In the coated optical fiber 1 in which the degree of freedom of the primary layer 11 determined by the equation (I) or the rigidity of the secondary layer 12 determined by the equation (II) satisfies the above-mentioned condition (that is, not the coated optical fiber 1 in which the degree of freedom $\beta_P \times P_{ISM}$ (MPa/K) of the primary layer 11 is less than $600 \times 10^{-6}$, or the rigidity $(S/P) \times (S_{ISM}/P_{ISM})$ of the secondary layer 12 is 1000 or less), in a range in which the rigidity of the secondary layer 12 represented by the equation (II) is on the horizontal axis, and the degree of freedom of the primary layer 11 represented by the equation (I) is on the vertical axis, the degree of freedom of the primary layer 11 generally tends to decrease as the rigidity of the secondary layer 12 increases.

In the present invention, regarding the suppression of the transmission loss, a reference for the loss level of the transmission loss at a wavelength of 1550 nm in a low temperature environment of a coated optical fiber 1 having an effective core cross-sectional area $A_{eff}$ of 130 μm² or more at a wavelength of 1550 nm (for example, 0.05 dB/km or less) is provided. Using these criteria as a guide, the condition of the degree of freedom of the primary layer 11 (equation (I)) or the condition of the rigidity of the secondary layer 12 (equation (II)) is selected as the above-mentioned range from the relationship between the degree of freedom of the primary layer 11 and the transmission loss described above or the relationship between the rigidity of the secondary layer 12 and the transmission loss.

The value of the thermal expansion coefficient $\beta_P$ of the primary layer 11 affects the parameter of the above equation (I), but the thermal expansion coefficient $\beta_P$ of the primary layer 11 is preferably $250 \times 10^{-6}$ to $2500 \times 10^{-6}$/K because the parameter of the equation (I) is satisfied. By setting the thermal expansion coefficient of the primary layer 11 to such a range, the degree of freedom of the primary layer 11 represented by the equation (I) can be within an appropriate range. The thermal expansion coefficient of the primary layer 11 may be measured by, for example, the method described in the following [Examples].

Further, the elastic modulus (primary elastic modulus) $P_{ISM}$ of the primary layer 11 for satisfying the parameters represented by the above equations (I) and (II) is preferably 0.2 to 3.0 MPa, but the elastic modulus $P_{ISM}$ is not particularly limited to such a range. In general, when the elastic modulus is increased, the thermal expansion coefficient decreases, and it is preferable to determine the elastic modulus $P_{ISM}$ of the primary layer 11 in consideration of the balance between the two.

Further, the elastic modulus (secondary elastic modulus) $S_{ISM}$ of the secondary layer 12 for satisfying the parameter represented by the equation (II) is preferably 2,000 MPa or less (≤2,000 MPa). By setting the elastic modulus of the secondary layer 12 to 2,000 MPa or less, the rigidity of the secondary layer 12 represented by the equation (II) can be within an appropriate range. The elastic modulus of the secondary layer 12 is particularly preferably 500 to 2,000 MPa.

The elastic modulus of each of the primary layer 11 and the secondary layer 12 may be measured by, for example, the method described in the following [Examples]. The elastic modulus of the primary layer 11 corresponds to the so-called In-situ Modulus (ISM), and the elastic modulus of the secondary layer 12 corresponds to the so-called 2.5% secant modulus.

In the present invention, as described above, when an optical fiber having high microbend sensitivity is used by satisfying at least one of the condition of the equation (I) and the condition of the equation (II), the transmission loss can be suppressed. Regarding the suppression of the transmission loss, it is considered that the loss level of the transmission loss at a wavelength of 1550 nm can be suppressed to a value smaller than 0.05 dB/km at a wavelength of 1550 nm (1.55 µm).

The coating thickness P of the primary layer 11 is preferably 10 to 60 µm, and the coating thickness S of the secondary layer 12 is preferably 10 to 60 µm. The thickness of each layer is not limited to these values and can be changed optionally.

The ratio (S/P) of the coating thickness S of the secondary layer 12 to the coating thickness P of the primary layer 11 is preferably less than 1 (<1). If the ratio is less than 1 (that is, the primary layer 11 is thicker than the secondary layer 12), the secondary layer 12 is relatively flexible, which leads to the primary layer 11 becoming easier to move, so that the transmission loss can be effectively suppressed.

The elastic moduli of the primary layer 11 and the secondary layer 12 and the thermal expansion coefficient of the primary layer 11 are adjusted by, for example, adjusting the components such as the ultraviolet curable resin constituting the primary layer 11 and the secondary layer 12 and the manufacturing conditions of these layers.

Specifically, the elastic moduli of the primary layer 11 and the secondary layer 12 can be adjusted depending on the type, molecular weight, and content of the oligomer, the type and addition amount of the diluted monomer, or the types and contents of other components, or the ultraviolet curing conditions such as the irradiation intensity in the ultraviolet curable resin and the like constituting the primary layer 11 and the secondary layer 12.

For example, the elastic modulus can be increased by reducing the molecular weight of the oligomer or increasing the content or functional groups of the diluting monomer to be added, so that these may be used as parameters for adjustment. On the other hand, in this way, the crosslink density becomes high and the shrinkage also becomes significant, so that it is preferable to adjust these in consideration of the balance.

(2) Manufacturing Method for Coated Optical Fiber 1:

An example of a manufacturing method for the coated optical fiber 1 according to the present invention will be described. In the following, the glass optical fiber 10 will be described as an example of the optical fiber 10.

To manufacture the coated optical fiber 1, for example, first, a preform containing silica glass as a main component is heated and melted by a drawing furnace (not shown) to obtain the silica glass optical fiber (glass optical fiber 10).

Next, liquid ultraviolet curable resin is applied to the glass optical fiber 10 using a coating die, and subsequently, ultraviolet rays are applied to the ultraviolet curable resin applied by an ultraviolet irradiation device (UV irradiation device) (not shown) to cure such a component. In this way, the coated optical fiber 1 in which the glass optical fiber 10 is coated with the primary layer 11 and the secondary layer 12 is manufactured. After drawing, the ultraviolet curable resin is immediately applied on the outer periphery of the glass optical fiber 10 to form the primary layer 11 and the secondary layer 12, which can prevent a decrease in strength of the obtained coated optical fiber 1.

In the present invention, it is preferable to control the type of the ultraviolet curable resin and the ultraviolet irradiation intensity during curing treatment as appropriate so that the thermal expansion coefficient and the elastic modulus of the primary layer 11 and the elastic modulus of the secondary layer 12 fall within predetermined ranges.

(3) Effect of Invention:

The coated optical fiber 1 according to the present invention described above satisfies at least one of the condition of the degree of freedom of the primary layer 11 shown in the equation (I) and the condition of the rigidity of the secondary layer 12 shown in the equation (II). Thus, a coated optical fiber 1 capable of suppressing transmission loss in a low temperature environment is provided, in which, even when an optical fiber 10 having a large effective core cross-sectional area $A_{eff}$ of the optical fiber 10 at a wavelength of 1550 nm and having high microbend sensitivity is used, transmission loss (microbend loss) in a low temperature environment (for example, −60° C.) can be suppressed.

The present invention can be widely used as a coated optical fiber 1 constituting a coated optical fiber ribbon or as a coated optical fiber 1 housed in an optical fiber cable. Further, the optical fiber cable or the coated optical fiber ribbon constituted by including the coated optical fibers 1 according to the present invention enjoy the effects of the above-described coated optical fiber 1. That is, the present invention provides an optical fiber cable or a coated optical fiber ribbon including the coated optical fibers 1 capable of suppressing transmission loss in a low temperature environment (for example, −60° C.) even when an optical fiber 10 having a large effective core cross-sectional area $A_{eff}$ of the optical fiber at a wavelength of 1550 nm and having high microbend sensitivity is used.

The configuration of the optical fiber cable is not particularly shown, and, for example, can be like a conventionally known optical fiber cable such as a configuration including the coated optical fibers 1 according to the present invention, in which an outer skin (sheath) is applied on the outer periphery thereof. The configuration is not particularly limited. The configuration of the optical fiber cable is freely selectable, and can be, for example, a configuration including the coated optical fibers 1, and tension members arranged on both sides of the coated optical fibers 1 in parallel with the coated optical fibers 1 in the longitudinal direction, in which an outer skin (sheath) is applied on the outer periphery of the coated optical fibers 1 and the like. Therefore, a configuration of a conventionally known optical fiber cable can be used, including configurations other than those described above.

Further, for example, a configuration of a so-called optical fiber drop cable in which a pair of notches formed in the longitudinal direction are formed on both sides of the optical fiber cable, and a support portion having a built-in support wire is arranged as necessary may be used.

The configuration of the optical fiber cable is not limited to the above configurations, and for example, the type and thickness of the material constituting the outer skin (sheath), the number and size of the coated optical fibers 1, and the type, number, and size of the tension members can also be freely selected. Further, the outer diameter and cross-sectional shape of the optical fiber cable, the shape and size of the notches, the presence or absence of the notch formation, and the like can also be freely selected.

Further, the configuration of the coated optical fiber ribbon including the plurality of coated optical fibers 1 is not particularly shown and can adapt a configuration of a conventionally known coated optical fiber ribbon in which a plurality of coated optical fibers 1 according to the present invention are arranged in parallel or the like, and connected or coated with a predetermined tape material or the like, and the coated optical fiber ribbon includes any of a flat ribbon wire, a rollable ribbon wire, and the like. As the configuration of the coated optical fiber ribbon, for example, a plurality of coated optical fibers 1 may be arranged in parallel and connected and integrated by a connecting portion made of an ultraviolet curable resin or the like. The number of coated optical fibers 1 (number of cores) in the coated optical fiber ribbon can also be, for example, 4 cores, 8 cores, 12 cores, 24 cores, etc., and the configuration of the coated optical fiber ribbon and the number of coated optical fibers 1 are not particularly limited, and can be freely selected.

(4) Modification of Embodiment:

It should be noted that the above-described aspect shows one aspect of the present invention, and the present invention is not limited to the above-described embodiment. It is needless to say that modifications and improvements that include the configurations of the present invention and are made within the range in which the object and effects of the present invention can be achieved are included in the contents of the present invention. Further, the specific structure, shape, and the like in carrying out the present invention may be any other structure, shape, and the like within the range in which the object and effects of the present invention can be achieved. The present invention is not limited to the above-described embodiment, and modifications and improvements made within the range in which the object of the present invention can be achieved are included in the present invention.

EXAMPLES

For example, in the above-described embodiment, the configuration of the coated optical fiber 1 has been described by showing the configuration in which the primary layer 11 is formed around the optical fiber 10, the secondary layer 12 is formed around the primary layer 11, and the primary layer 11 and the secondary layer 12 are formed in this order. However, a colored layer 13 may be formed around the secondary layer 12 (referred to as a colored coated optical fiber 1).

Figure 2:
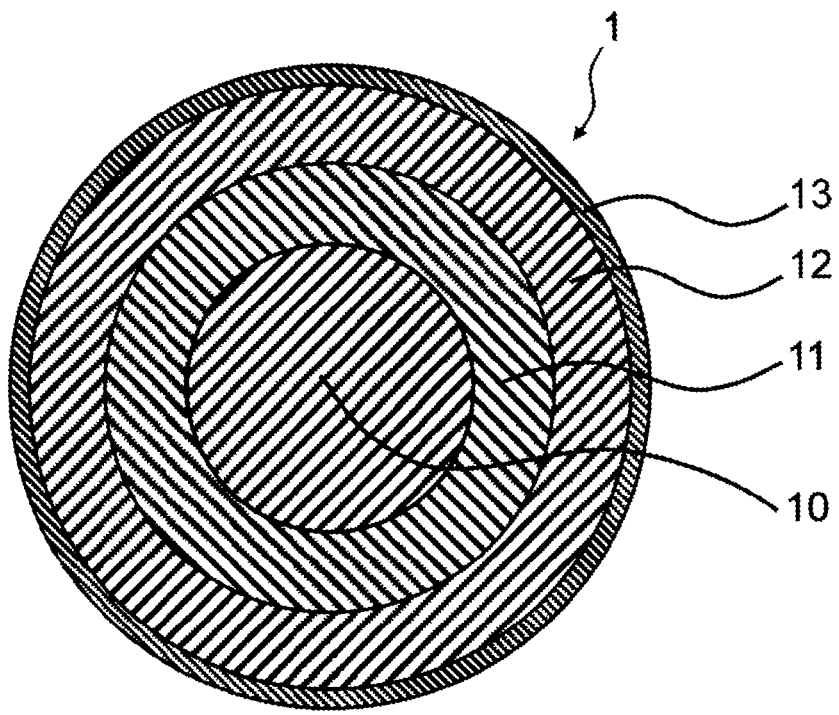
FIG. 2 is a cross-sectional view showing another example of the structure of the coated optical fiber.

FIG. 2 is a cross-sectional view showing another example of the structure of the coated optical fiber 1. In the configuration shown in FIG. 2 in which the colored layer 13 is formed around the secondary layer 12 to form the colored coated optical fiber 1, as the constituent material of the colored layer 13, the ultraviolet curable resin mentioned above as the components constituting the primary layer 11 and the secondary layer 12, for example, oligomer, diluting monomer, photoinitiator, silane coupling agent, sensitizer, pigment, lubricant, and the components of the various additives described above can be preferably used.

Even in the configuration shown in FIG. 1, the secondary layer 12 may be colored to form a colored secondary layer 12 as the outermost layer of the coated optical fiber 1. When the secondary layer 12 is colored, the colored secondary layer 12 can be obtained by adding a coloring material mixed with pigment, lubricant, or the like to the secondary layer 12.

The content of the coloring material in the colored secondary layer 12 may be appropriately determined depending on the content of the pigment contained in the coloring material, the type of other components such as the ultraviolet curable resin, and the like.

In addition, the specific structure, shape, and the like when the present invention is carried out may be other structures and the like within the range in which the object of the present invention can be achieved.

EXAMPLES

Hereinafter, the present invention will be described in more detail based on Examples and Comparative Examples, but the present invention is not limited thereto.

Examples 1 to 7, Comparative Examples 1 and 2

Manufacture of Coated Optical Fiber:

Using optical fibers considered to have high microbend sensitivity as optical fibers in which $A_{\mathit{eff}}$ at a wavelength of 1550 nm is 130 $\mu m^2$ or more with the fiber effective cross-sectional area $A_{\mathit{eff}}$ ($\mu m^2$), the coating thickness P ($\mu m$) of the primary layer, and the coating thickness S ($\mu m$) of the secondary layer at a wavelength of 1550 nm shown in Table 1, the primary layer and the secondary layer were applied around the glass optical fiber made of silica glass in this order so as to have the coating thicknesses (P ($\mu m$), S ($\mu m$)) shown in Table 1, thereby manufacturing coated optical fibers having the configurations shown in FIG. 1. The cable cutoff wavelength of the coated optical fiber is 1260 nm to 1520 nm. In addition, examination was mainly made for the optical fiber diameter with a glass diameter of about 125 $\mu m$, but even when examination was made with the glass diameter set to 100 $\mu m$ or 80 $\mu m$, desired characteristics which satisfied the conditions of the equations (I) and (II) were confirmed.

The primary layer and the secondary layer were manufactured using commercially available ultraviolet curable resin (oligomer, diluted monomer, photoinitiator, silane coupling agent, sensitizer, lubricant, or the like). The elastic moduli of the primary layer and the secondary layer and the thermal expansion coefficient of the primary layer, which were the parameters, were adjusted so as to have values shown in Table 1 by changing (adjusting) the ultraviolet curing conditions or the like depending on the type of the ultraviolet curable resin and the ultraviolet irradiation conditions (for example, the weight average molecular weight and content of the oligomer constituting the ultraviolet curable resin, the type, number, and content of functional groups in the dilute monomer, the type of the photoinitiator, the ultraviolet irradiation intensity, or the like).

Specifically, Example 1 and Comparative Example 1 were manufactured by using common materials for the primary layer and the secondary layer, and changing (adjusting) the coating thicknesses and manufacturing conditions of the primary layer and the secondary layer (the ultraviolet irradiation intensity or the like, the same applies hereinafter to the manufacturing conditions). Example 2 and Comparative Example 2 were manufactured by using common materials for the primary layer and the secondary layer, and changing (adjusting) the coating thicknesses and manufacturing conditions of the primary layer and the secondary layer.

Examples 3 to 5 in which the materials of the primary layer are different and the materials of the secondary layer are common in Examples 3 and 4, and the materials of the primary layer are common and the materials of the secondary layer are different in Examples 4 and 5 (the materials of both the primary layer and the secondary layer are different in Examples 3 and 5) were manufactured by changing (adjusting) the coating thicknesses and manufacturing conditions of the primary layer and the secondary layer. Examples 6 and 7 were manufactured by using common materials for the primary layer and the secondary layer, and changing (adjusting) the coating thicknesses and manufacturing conditions of the primary layer and the secondary layer.

Test Example 1

Regarding the obtained coated optical fibers of Examples 1 to 7 and Comparative Examples 1 and 2, "(1) elastic modulus of the primary layer", "(2) elastic modulus of the secondary layer", "(3) thermal expansion coefficient of the primary layer", and "(4) transmission loss" were measured using the measurement methods shown below. The results are shown in Table 1.

(1) Elastic Modulus of Primary Layer:

The elastic modulus (In-situ Modulus: ISM) of the primary layer was measured by the following method. First, a few mm of the primary layer and the secondary layer in the middle part of the optical fiber were peeled off using a commercially available stripper, and then one end of the optical fiber on which the coating was formed was fixed on a slide glass with an adhesive, and a load F was applied to the other end of the optical fiber on which the coating was formed. In this state, a displacement δ of the primary layer at the boundary between the portion where the coating was peeled off and the portion where the coating was formed was read with a microscope. In addition, by setting the load to be applied to 10, 20, 30, 50, and 70 gf (98, 196, 294, 490, 686 (mN) in that order), a graph of the displacement with respect to the load was created. Then, the slope obtained from the graph and the elastic modulus (primary elastic modulus) $P_{ISM}$ of the primary layer were calculated using the following equation (X).

[Math. 4]

$$P_{ISM}=(3F/\delta)\times(1/2\pi l)\ln(D_P/D_G) \qquad (X)$$

Here, $P_{ISM}$ is the elastic modulus (MPa) of the primary layer, $F/\delta$ is the slope shown in the graph of the displacement (δ) with respect to the load (F), l is the sample length (for example, 10 mm), and $D_P/D_G$ is the ratio of the outer diameter $(D_P)$ (μm) of the primary layer to the outer diameter $(D_G)$ (μm) of the optical fiber. The outer diameter of the primary layer and the outer diameter of the optical fiber were measured by observing the cross section of the optical fiber cut by a fiber cutter with a microscope (refer also to the item (3) described later).

(2) Elastic Modulus of Secondary Layer:

An optical fiber was immersed in liquid nitrogen and the coating was peeled off with a stripper to prepare a sample having only the coating in which the glass optical fiber is pulled out from the optical fiber, and the end portion of the sample was fixed to an aluminum plate with an adhesive. The aluminum plate portion was chucked using a Tensilon universal tensile tester in an atmosphere with a temperature of 23° C. and a relative humidity of 50%. Next, by pulling the sample at a marked line spacing of 25 mm and a tensile speed of 1 mm/min and measuring the force at 2.5% elongation, the elastic modulus (secondary elastic modulus) $S_{ISM}$ (2.5% secant modulus) of the secondary layer was calculated.

(3) Thermal Expansion Coefficient of Primary Layer:

The calculation method of the thermal expansion coefficient of the primary layer (volume thermal expansion coefficient of −50° C. to 25° C.) is described below (specifically, the calculation is performed according to the description in the Furukawa Electric review No. 122 (September 2008), "A Study for Estimating Thermal Strain and Residual Stress in Optical Fiber Coatings", "4-3", the outline is shown below.). First, two types of coating samples were prepared for the primary layer. One is a sample in which a primary layer and a secondary layer are applied on a glass optical fiber (hereinafter referred to as "fiber sample"), and the other is a sample having only a coating layer in which a glass optical fiber is removed from a coated optical fiber (hereinafter referred to as "tube coating sample (tube sample)").

For the measurement of the thermal expansion coefficient, a commercially available TMA thermomechanical analysis (Mettler Toledo TMA 40) was used to measure the longitudinal direction and the outer diameter direction. The measurement conditions are such that the applied load is 0 loads, the cooling speed is −10° C./min in the temperature range of 25° C. to −100° C., the holding time is 10 minutes at −100° C., and the temperature rise rate is 10° C./min at −100° C. to 100° C.

Regarding the longitudinal direction, the measurement was performed using a tube coating sample (tube sample) in a tensile mode, and regarding the outer diameter direction, the measurement was performed using a fiber sample and the tube coating sample (tube sample) in a compression mode.

Then, the relationship between the measured temperature in the longitudinal direction and the linear expansion rate and the relationship between the measured temperature in the outer diameter direction and the linear expansion rate were graphed. Since the linear expansion coefficient of the coating layer changes significantly near the glass transition temperature $(T_g)$ of the coating layer, in this measurement, −50° C., which is near the glass transition temperature of the primary layer, is defined as a reference, and each linear expansion coefficient is determined from the slope of the temperature range of −50° C. to 25° C., which is the range in which the measurement result changes linearly.

The thermal expansion coefficients (volume thermal expansion coefficients of −50° C. to 25° C.) of the primary layer and the secondary layer were estimated from the linear expansion coefficient of the tube coating sample (tube sample) in the tensile mode (longitudinal direction) and the linear expansion coefficient of each of the fiber sample and the tube sample in the compression mode (outer diameter direction).

Also, in order to calculate the thermal expansion coefficient of the primary layer (volume thermal expansion coefficient from −50° C. to 25° C., which is hereinafter simply referred to as a "thermal expansion coefficient" including the secondary layer), first, the thermal expansion coefficient of the secondary layer was calculated. Normally, the glass transition temperature of the primary layer is as low as −50° C. In the temperature range above the glass transition temperature such as −50° C. to 25° C., the primary layer of the tube coating sample (tube sample) is in a rubber state, and the elastic modulus is significantly smaller than that of the secondary layer, so that the secondary layer can expand and contract freely.

The thermal expansion coefficient of the secondary layer is determined by doubling the linear expansion coefficient in the outer diameter direction and adding the linear expansion coefficient in the longitudinal direction, and the thermal expansion coefficient of the secondary layer is determined by the following equation (Y). Here, $\beta_S$ is the thermal expansion coefficient (volume thermal expansion coefficient) (/K) of the secondary layer, $\alpha_{SL}$ is the linear expansion coefficient (/K) in the longitudinal direction of the secondary layer, and $\alpha_{SR}$ is the linear expansion coefficient (/K) in the outer diameter direction of the secondary layer.

[Math. 5]

$$\beta_S = \alpha_{SL} + (2 \times \alpha_{SR}) \quad (Y)$$

Regarding the obtained fiber sample, since the primary layer is adhered to the optical fiber, the secondary layer cannot freely expand and contract, so that the thermal expansion of the coating layer is constrained by the optical fiber. Further, since the thermal expansion coefficient of the silica glass constituting the optical fiber is significantly smaller than that of the coating layer, the thermal expansion can be ignored. From the above, the thermal expansion coefficient of the primary layer (volume thermal expansion coefficient at −50° C. to 25° C.) was calculated from the following equation (Z).

In the equation (Z), $\beta_P$ is the thermal expansion coefficient of the primary layer (volume thermal expansion coefficient) (/K), $\beta_S$ is the thermal expansion coefficient of the secondary layer (volume thermal expansion coefficient) (/K) (calculated by the equation (Y)), $\alpha_{FR}$ is the linear expansion coefficient in the outer diameter direction of the fiber sample (/K), $D_G$ is the outer diameter of the optical fiber (about 125 μm), $D_P$ is the outer diameter of the primary layer (μm), and $D_S$ is the outer diameter of the secondary layer (μm) (the outer diameter of the primary layer is calculated by "outer diameter of optical fiber+(coating thickness of primary layer×2)", and the outer diameter of the secondary layer is calculated by "outer diameter of primary layer+(coating thickness of secondary layer×2)").

[Math. 6]

$$D_G + (D_P - D_G) \times (1 + (\beta_P/2)) + (D_S - D_P) \times (1 + (\beta_S/2)) = D_S \times (1 + \alpha_{FR}) \quad (Z)$$

(4) Transmission Loss (Microbend Loss):

The transmission loss in a low temperature environment (−60° C.) was measured. Specifically, the coated optical fiber was placed in a heat cycle tank, and the transmission loss was measured while performing a heat cycle test of −60° C. to 85° C. for 3 cycles.

The transmission loss was measured by measuring the transmission loss at a wavelength of 1550 nm (1.55 μm) at −60° C., and the determination criterion was such that the transmission loss was 0.05 dB/km or less (a case where the transmission loss was 0.05 dB/km or less was determined as being passed, and a case where it exceeded 0.05 dB/km was determined as being failed).

(Configurations and Results)

TABLE 1

|  | Fiber Effective Cross-sectional Area | Coating Thickness | | Elastic Modulus | | Thermal Expansion Coefficient of Primary Layer | Rigidity of Secondary Layer (Equation (II)) (S/P) × | Degree of Freedom of Primary Layer (Equation (I)) | Transmission Loss (−60° C.) |
|---|---|---|---|---|---|---|---|---|---|
|  | $A_{eff}$ μm² | P μm | S μm | $P_{ISM}$ MPa | $S_{ISM}$ MPa | $\beta_P$ ×10⁻⁴/K | $(S_{ISM}/P_{ISM})$ — | $\beta_P \times P_{ISM}$ ×10⁻⁶ MPa/K | @1550 nm dB/km |
| Example 1 | 160 | 45 | 21 | 1.10 | 1453 | 1072 | 627 | 1180 | 0.017 |
| Comparative Example 1 | 160 | 33 | 31 | 1.03 | 1473 | 813 | 1340 | 837 | 1.100 |
| Comparative Example 2 | 131 | 33 | 25 | 0.71 | 1806 | 953 | 1899 | 673 | 0.100 |
| Example 2 | 131 | 20 | 13 | 0.60 | 1780 | 654 | 1854 | 392 | 0.003 |
| Example 3 | 131 | 36 | 23 | 0.75 | 956 | 969 | 809 | 726 | 0.003 |
| Example 4 | 131 | 29 | 30 | 0.35 | 1141 | 860 | 3400 | 299 | 0.005 |
| Example 5 | 131 | 34 | 24 | 0.47 | 339 | 1039 | 497 | 491 | 0.001 |
| Example 6 | 131 | 40 | 25 | 0.63 | 651 | 885 | 641 | 556 | 0.005 |
| Example 7 | 131 | 30 | 25 | 0.52 | 650 | 782 | 1190 | 406 | 0.005 |

As shown in Table 1, in the coated optical fibers of Examples 1 to 7 which satisfied at least one condition of the equations (I) and (II) (Examples 5 and 6 satisfied both the conditions of the equations (I) and (II)), when an optical fiber having a fiber effective cross-sectional area of 130 μm² or more at a wavelength of 1550 nm and high microbend sensitivity was used as the optical fiber, transmission loss (microbend loss) in a low temperature environment was 0.05 dB/km or less, and the transmission loss could be suppressed. On the other hand, in the coated optical fibers of Comparative Example 1 and Comparative Example 2 which did not satisfy both the conditions of the equations (I) and (II), the transmission loss exceeded 0.05 dB/km, and the transmission loss could not be suppressed.

INDUSTRIAL APPLICABILITY

The present invention can be effectively used as a means for providing a coated optical fiber including an optical fiber having high microbend sensitivity, in which transmission loss in a low temperature environment such as −60° C. is suppressed, and an optical fiber cable or a coated optical fiber ribbon including the coated optical fibers, and has high industrial applicability.

REFERENCE SIGNS LIST 1 coated optical fiber (colored coated optical fiber)
10 optical fiber
11 primary layer (primary coating layer)
12 secondary layer (secondary coating layer)
13 colored layer

What is claimed is:

1. A coated optical fiber in which a primary layer that covers an optical fiber is formed around the optical fiber, and a secondary layer that covers the primary layer is formed around the primary layer, the primary layer and the secondary layer being formed in this order
wherein an effective core cross-sectional area $A_{eff}$ of the optical fiber at a wavelength of 1550 nm is 130 µm² or more, and
wherein, when a coating thickness of the primary layer is P (µm),
a coating thickness of the secondary layer is S (µm),
a thermal expansion coefficient of the primary layer is $\beta_P$ (/K),
an elastic modulus (primary elastic modulus) of the primary layer is $P_{ISM}$ (MPa), and
an elastic modulus (secondary elastic modulus) of the secondary layer is $S_{ISM}$ (MPa),
a condition of the following equations (I), or
a condition of both the following equations (I) and (II) is satisfied

[Math. 1]

$$491 \times 10^{-6} \leq \beta_P \times P_{ISM} < 600 \times 10^{-6} \quad (I)$$

$$(S/P) \times (S_{ISM}/P_{ISM}) \leq 1000 \quad (II)$$

2. The coated optical fiber according to claim 1, wherein both the equation (I) and the equation (II) are satisfied.

3. The coated optical fiber according to claim 1, wherein a ratio (S/P) of the coating thickness S of the secondary layer to the coating thickness P of the primary layer is less than 1.

4. The coated optical fiber according to claim 1, wherein the elastic modulus (secondary elastic modulus) $S_{ISM}$ of the secondary layer is 2,000 MPa or less.

5. An optical fiber cable comprising the coated optical fiber according to claim 1.

6. A coated optical fiber ribbon comprising a plurality of the coated optical fibers according to claim 1.

7. The coated optical fiber according to claim 1, wherein the effective core cross-sectional area $A_{eff}$ of the optical fiber at a wavelength of 1550 nm is larger than 130 µm².

* * * * *